US012587707B2

(12) United States Patent       (10) Patent No.:    US 12,587,707 B2
Gallusser                           (45) Date of Patent:       Mar. 24, 2026

(54) SESSION TYPE CLASSIFICATION FOR MODELING

(71) Applicant: Disney Enterprises, Inc., Burbank, CA (US)

(72) Inventor: Fabian Gallusser, Palo Alto, CA (US)

(73) Assignee: Disney Enterprises, Inc., Burbank, CA (US)

( * ) Notice: Subject to any disclaimer, the term of this patent is extended or adjusted under 35 U.S.C. 154(b) by 74 days.

(21) Appl. No.: 18/175,465

(22) Filed: Feb. 27, 2023

(65) Prior Publication Data

US 2024/0292059 A1     Aug. 29, 2024

(51) Int. Cl.
*H04N 21/466*        (2011.01)
*H04N 21/45*         (2011.01)

(52) U.S. Cl.
CPC ..... *H04N 21/4665* (2013.01); *H04N 21/4532* (2013.01)

(58) Field of Classification Search
None
See application file for complete search history.

(56) References Cited

U.S. PATENT DOCUMENTS

| 9,473,814 | B1 * | 10/2016 | Schlack | ................. | H04H 60/46 |
| 9,654,360 | B1 * | 5/2017 | Kellicker | ............. | H04L 65/612 |
| 10,846,051 | B1 * | 11/2020 | Chatzipanagiotis | .... | G06F 7/023 |
| 2003/0036899 | A1 * | 2/2003 | Leslie | ................. | H04N 21/466 |
| | | | | | 707/E17.121 |

| 2007/0300257 | A1 * | 12/2007 | Ryu | ................. | H04N 21/44224 |
| | | | | | 725/44 |
| 2011/0173235 | A1 * | 7/2011 | Aman | .................... | G06V 40/23 |
| | | | | | 707/E17.055 |
| 2012/0151511 | A1 * | 6/2012 | Bernard | ............. | H04N 21/4826 |
| | | | | | 725/10 |
| 2015/0039608 | A1 * | 2/2015 | Basilico | ................. | G06N 20/00 |
| | | | | | 707/734 |
| 2018/0249113 | A1 * | 8/2018 | Faulkner | .............. | G11B 27/002 |
| 2019/0379935 | A1 * | 12/2019 | Shankar | ............. | H04N 21/8456 |
| 2020/0396495 | A1 * | 12/2020 | Natesan | ............... | H04N 21/252 |
| 2022/0329893 | A1 * | 10/2022 | Karazoun | ............. | H04L 67/535 |
| 2023/0081741 | A1 * | 3/2023 | Liu | ........................ | G06N 5/025 |
| | | | | | 704/9 |

(Continued)

OTHER PUBLICATIONS

U.S. Appl. No. 17/713,225, filed Apr. 4, 2022, Inventor Gallusser, et al., Titled "Model-Based Prediction for User Access of Content," 37 pages.

(Continued)

*Primary Examiner* — Mushfikh I Alam
(74) *Attorney, Agent, or Firm* — Kwan & Olynick LLP

(57)                ABSTRACT

In some embodiments, a method receives data for sessions that is generated based on use of a service. The data for a session includes session characteristic values for a set of session characteristics that is associated with the session. The method classifies the sessions into a plurality of session types to generate feature values for the plurality of session types. The session characteristic values for the session are compared to a set of reference characteristics for respective session types in the plurality of sessions to perform the classifying. The feature values are analyzed for the plurality of session types using a model to generate a prediction for the service and the is outputted prediction.

20 Claims, 10 Drawing Sheets

(56)     References Cited

U.S. PATENT DOCUMENTS

| | | | |
|---|---|---|---|
| 2023/0138579 A1* | 5/2023 | Barkan | G06Q 30/0631 |
| | | | 707/732 |
| 2023/0209133 A1* | 6/2023 | Ouegnin | G06Q 30/0242 |
| | | | 725/12 |
| 2023/0217069 A1* | 7/2023 | Tapse | H04N 21/252 |
| | | | 725/14 |
| 2023/0298628 A1* | 9/2023 | Feng | G06V 10/82 |
| | | | 386/278 |
| 2023/0388601 A1* | 11/2023 | Panchaksharaiah | |
| | | | H04N 21/4788 |
| 2024/0073484 A1* | 2/2024 | Finc | H04N 21/44218 |

OTHER PUBLICATIONS

Jordan, J. (2017). Hyperparameter tuning for machine learning models. Data Science, 16 pages.

* cited by examiner

300

| User ID | Session ID | Timestamp | Event |
|---------|-----------|-----------|-------|
| 123 | 123-1 | 20:05:00 | Logon |
| 123 | 123-1 | 20:06:00 | Search |
| 123 | 123-1 | 20:07:00 | Stream start |
| 123 | 123-1 | 21:00:00 | Stream end |
| 123 | 123-2 | 14:30:00 | Logon |
| 123 | 123-2 | 14:35:00 | Logoff |
| 456 | 456-1 | 17:00:00 | Logon |
| 456 | 456-1 | 17:01:00 | Stream 1 start |
| 456 | 456-1 | 17:06:00 | Crash |
| 456 | 456-1 | 17:06:00 | Stream 1 end |
| 456 | 456-1 | 17:07:00 | Stream 2 start |
| 456 | 456-1 | 17:37:00 | Stream 1 end |

304 306 308 310

302

| Session ID | Session Duration | Number of Searches | Number of Crashes | Number of Streams | Stream Duration |
|------------|------------------|--------------------|--------------------|--------------------|-----------------|
| 123-1 | 115 mins | 1 | 0 | 1 | 113 mins |
| 123-2 | 5 mins | 0 | 0 | 0 | 0 |
| 456-1 | 37 mins | 0 | 1 | 2 | 35 mins |

| User ID | Session ID | Timestamp | Event |
|---------|-----------|-----------|-------|
| 123 | 123-1 | 20:05:00 | Logon |
| 123 | 123-1 | 20:06:00 | Search |
| 123 | 123-1 | 20:07:00 | Stream Start |
| 123 | 123-1 | 22:00:00 | Stream Stop |

402

| Session ID | Session Duration | Number of Searches | Number of Crashes | Number of Streams | Stream Duration |
|-----------|------------------|--------------------|--------------------|--------------------|-----------------|
| 123-1 | 115 | 1 | 0 | 1 | 113 |

404

406  408  410  412  414  416  418

| Session Types | Name | Session Duration | Number of Searches | Number of Crashes | Number of Streams | Stream Duration |
|---------------|------|------------------|--------------------|--------------------|--------------------|-----------------|
| 1 | Movie | 100 | 0 | 1 | 1 | 95 |
| 2 | TV | 180 | 0 | 2 | 5 | 175 |
| 3 | Watchlist | 5 | 5 | 0 | 0 | 0 |
| 4 | Frustrated | 4 | 6 | 0 | 0 | 0 |

| Cluster | Number | Duration | Pageviews | Stream time | Watchlist interaction | Movies streamed |
|---|---|---|---|---|---|---|
| 1 | 20000 | 26000-44000 | 30 | 20000-32000 | 0-0 | 0-0 |
| 2 | 60000 | 3000-7000 | 10 | 0-3000 | 0-0 | 0-0 |
| 3 | 3000000 | 0-150 | 4 | 0-0 | 0-0 | 0-0 |
| 4 | 45000 | 21000-40000 | 20 | 0-5347 | 0-0 | 0-0 |
| 5 | 180000 | 8000-14000 | 15 | 7000-10000 | 0-0 | 0-0 |
| 6 | 115000 | 1300-10000 | 8 | 400-6300 | 0-0 | 1-1 |
| 7 | 2000 | 600-7000 | 50 | 0-0 | 8-15 | 0-0 |
| 8 | 100 | 1700-7000 | 200 | 0-0 | 50-80 | 0-0 |

800

Supervised Training Method

Receive session features and non-session based features ⟶ 802

Input features into the model ⟶ 804

Analyze the features ⟶ 806

Output predictions ⟶ 808

Output insights from the predictions ⟶ 810

Perform session type parameter tuning of the session types configuration based on the predictions ⟶ 812

To FIG. 6

SESSION TYPE CLASSIFICATION FOR MODELING

BACKGROUND

A company may generate predictions from information related to user data. For example, a company may provide a service, such as a video delivery service in which users playback content, and the company may want to generate different predictions, such as whether the user account may become disengaged with the service, upgrade the service, increase or decrease engagement, watch a type of video, etc. In some examples, a company may use a prediction network that can generate the predictions. A typical method may be to determine values for features based on the user account that is using the service. The values are input into a model that is implemented by the prediction network to generate a prediction.

Sometimes, more features are added in an attempt to generate a more accurate prediction. For example, some features may be the result of coarse feature aggregation, such as total hours streamed in the past month, the number of items added to a watchlist for later viewing since signup, etc. These highly aggregated numbers may fail to capture true user account level engagement and interactions with the service. Also, as more features are added, the model may not be able to sensibly analyze all the features to determine a prediction that makes sense, essentially leading to overfitting where the model fits too closely against the training data used for the features, but not for new data in which a prediction is being determined. Also, once the prediction is received, when a large number of features are used, it may be hard to determine which features contributed to the predicted outcome. For example, when the prediction is a user may disengage with the service, the company may not be able to determine which features are significantly contributing to the prediction that the user might disengage the service. Additionally, using more and more features may be very costly to store, compute, and maintain, especially when the number of user accounts using this service continually increases and more and more data is received.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 3 depicts an example of raw session data and a formatted session data according to some embodiments.

DETAILED DESCRIPTION

Figure 1:
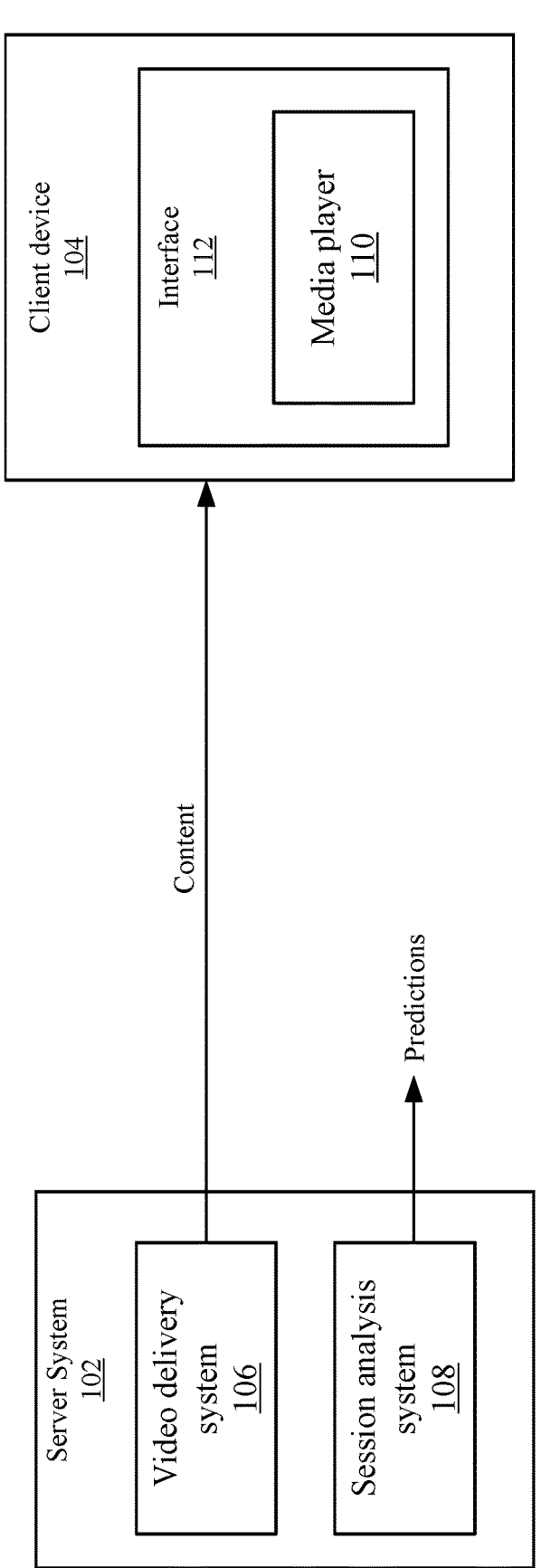
FIG. 1 depicts a simplified system for generating predictions according to some embodiments.

Described herein are techniques for a prediction network system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

Overview

A system may use data for session types to generate predictions. A session may include data that is received from a first event to a second event that defines the session. For example, a session may start when a log on to a service is received from a user account and the second event may be when a log off or termination of the session by the user account is received. Other events may also define a session. For example, the start of playback of content and the ending of playback of content may be a session, the start of a search and the end of the search, etc. The session may be characterized by session characteristics. For example, the session characteristics may include a session duration, a number of searches, a number of streams, etc. The session duration may be the length of the session, the number of searches may be the number of searches performed during the session, the number of streams may be the number of instances of content that are streamed during the session. Other characteristics may also be used.

A session type may be a categorization of a session that may have certain defined values for characteristics. The session types may be labeled with descriptive identifiers. For example, a session type may be labeled as a "family movie night", which may include the characteristics of playing back a movie on weekend evenings. Another session type may be a "television (TV) session", which may include the characteristics of playing back multiple episodes of the same show consecutively. The system analyzes data for a user account to classify sessions in session types. The values for the session types may be input into one or more models as session features. For example, if a user account played back a movie on Friday night, the session feature for the family movie night session type may be increased by one occurrence. Additional occurrences that meet the session type characteristics may increase the count. A session type may be different from aggregating values over multiple sessions because a session type may be based on characteristics of a single session. The session type may also provide different insight into the session compared to an aggregated value over multiple sessions. For example, an aggregated value for number of sessions over a month may be 65. However, the session types may indicate it was 50 short streaming sessions versus 15 long movie sessions, which may provide different insight into what occurred during the sessions.

The system may use one or more models that is implemented by a prediction network to generate a prediction. The prediction may be different outcomes, such as a likelihood or probability the user may disengage with the service, upgrade the service, discover new content, reconnect to the service after disengaging, interact with content, increase or decrease engagement with the service, etc. Although session types may be described with respect to using a video delivery service and the playback of content, the session types may be based on other areas. For example, the session types may be based on areas where activity can be classified into different types, such as search behavior, application use, etc.

The use of session type features may improve the prediction. For example, the session type features may provide more meaningful, interpretable, and transparent predictions. Because fewer features may be input into the model, it may be easier to correlate that an input is highly probable it is the reason for an outcome, such as correlating a feature or set of features to why a user account may disengage with the service. The disengagement may include becoming disinterested in the service, not using the service, canceling the service, etc. For example, a reason may be attributed to a session type, such as the user account has a lot of sessions where the user account could not find anything to watch and logs off the service without watching anything. If a large number of features were used to generate the prediction, the relationship between which features caused or had the most weight in generating the prediction may be harder to determine. However, using session types, and therefore fewer features, an impactful correlation may be attributed to one or more session types. For example, knowing a user account streamed 10 hours over the past week fails to distinguish the very different situations of a user account with three movie night sessions as opposed to six TV sessions. That is, more and different insights may be determined from the session types of movie nights or TV sessions compared to a generic number of hours.

The use of session types may also improve a computing system. For example, using less features may use less storage and use less computing resources to compute values for the features. Also, the use of less features may make the model simpler and allow the model to execute faster because less features may have to be processed. Also, training may be improved because the model does not need to be trained to process a large number of features. Further, training the model may also be improved using an unsupervised learning process and a supervised learning process. An unsupervised learning process may determine the number of clusters for session types that is generated from data. Then, session type features may be input into models in a supervised learning process. The outputted predictions may be used to adjust the number of clusters for session types that were configured during the unsupervised learning process. The unsupervised learning and supervised learning process will be described in more detail below.

System Overview

FIG. 1 depicts a simplified system 100 for generating predictions according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices that interact with server system 102.

Server system 102 may include a video delivery system 106 that delivers content to client device 104. In some embodiments, video delivery system 106 may use a content delivery network (CDN) (not shown) to deliver the content.

The content may be requested by a user account associated with client device 104. For example, a user account may request a movie, an episode of a show, etc. Although content with respect to videos may be described, it will be understood that other content may also be delivered, such as audio, a website, a page of content, etc.

Client device 104 may be a computing device, such as a smartphone, living room device, personal computer, tablet, television, set-top box, etc. Client device 104 may include an interface 112 that may display content, such as a library of videos may be recommended for browsing. Also, a media player 110 may playback a video that is requested from video delivery system 106. A user account may use client device 104 and may be associated with video delivery system 106 (e.g., the user account signs up for the service). A user that is associated with the user account may use client device 104. Different events may occur at client device 104 based on the use of the service. The events may include log on, log off, stream start, stream stop, crashes, etc.

Although multiple client devices are not shown, video delivery system 106 may receive multiple requests from multiple client devices. Multiple client devices may send requests for content to video delivery system 106. For example, the requests may be for playback of different content, such as different videos.

As described above, data from a user account may be received based on the use and interactions by the user account for the service. Session analysis system 108 may generate values for session types from the data. For example, different session types may be based on different characteristics from a session. The session types may include multiple characteristics that define a session instead of multiple individual features that may be based on multiple sessions. The session types may be generally labeled, such as using a label of "movie night", "TV session", "watchlist", and "frustrated" labels. Each session type may be associated with different characteristics. For example, the "movie night" session type may include characteristics where on a weekend, a single movie is watched by the user account. The "TV session" session type may be when multiple episodes of the same show are watched consecutively. The "watchlist" session type may be a short session where the user account explores and adds content to a watchlist to watch later, but does not play back any content. The "frustrated" session type may be where the user account searches for content, but nothing is played back or added to the watchlist to play back later. Session analysis system 108 may analyze the data and generate values for each session type feature based on the data, such as aggregating the number of sessions that fall within each session type, a number of unique session types, an average number of sessions per day, etc.

A session analysis system 108 may analyze session type features to generate predictions using one or more models implemented by a prediction network. For example, the values for the session type features along with values for non-session type features are input into one or more models being implemented by the prediction network and a prediction is an output. The non-session type based features may be features not associated with the session type, such as an age, gender, number of devices ever used, number of brands/franchises ever streamed, etc.

The session types may allow session type inputs to be correlated to an output. The prediction generated by the one or more models may be based on the values of the session types that are input along with values for any non-session type features. In some examples, session analysis system 108 may want to analyze whether a user account may disengage with the service. After receiving a high probability that the user account may disengage with the service, the session type features may provide insight into the reason for the high probability. For example, session analysis system 108 can review the session type features to determine a cause for the high probability of disengagement. In some examples, a user account that has a large number of the session types of "frustrated", and it may be determined that the cause of why the user account might become disengaged with the service may be because the user account cannot find anything to playback. In this case, video delivery system 106 may proactively attempt to engage the user account to limit the number of searches where nothing is played back or added to the watchlist for playback later. The analysis of the session types may provide more insight and correlation into the reason for the output of a high probability of disengagement.

The following will now describe the prediction method in more detail and then the training process.

Prediction Generation

Figure 2:
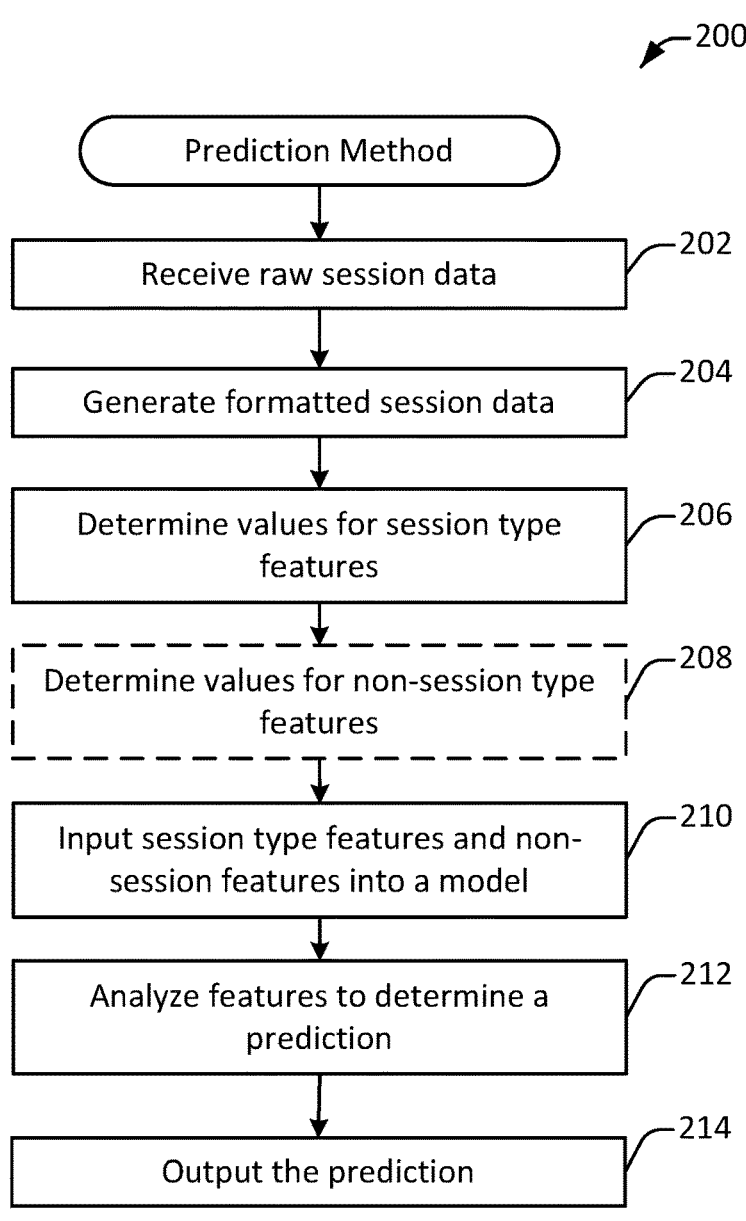
FIG. 2 depicts a simplified flowchart the method for generating predictions according to some embodiments.

FIG. 2 depicts a simplified flowchart 200 the method for generating predictions according to some embodiments. Before generating predictions, the training of one or more models may be performed to determine the session types. Additionally, the one or more models may be trained to generate the predictions based on the session type features. The training will be discussed in more detail below in FIGS. 4-6. The following process assumes the session types have been determined and the one or more models has been trained.

At 202, session analysis system 108 receives raw session data. Video delivery system 106 may receive messages that summarize events that occur during the session, such as a log on, search, stream start, stream stop, log off, crash, and other events. Video delivery system 106 may receive a large number of messages for events that occur in multiple sessions. For example, each session may be associated with multiple messages. In some cases, analyzing the individual messages may not be efficient. Accordingly, at 204, session analysis system 108 may generate formatted session data. The formatted session data may be an intermediate data set that may be analyzed more efficiently than the raw session data. In some embodiments, session analysis system 108 may process, such as aggregate or summarize, data found in messages for each session. Session analysis system 108 may determine the start and end of a session differently, such as a session identifier may be included in the messages to identify the sessions, the events may be analyzed to determine the start and end of the sessions, etc. The formatted session data may include an entry for a single session that associates the session data with the session. For example, the entry may be a row, column, a field/combination of fields, other storage methods, etc. In some embodiments, the formatted session data may be stored in a single row. However, an entry may include data for multiple sessions, or a single session may have multiple entries (e.g., stored on multiple rows). An entry may be associated with session characteristics, such as a session duration, a number of searches, a number of crashes, a number of streams, a stream duration, etc. Examples of raw session data and formatted session data are shown in FIG. 3.

At 206, session analysis system 108 determines values for session type features. As described above, session analysis system 108 may analyze the formatted session data to determine how many sessions are classified in each session type. Depending on the occurrences of the session types in the formatted session data, session analysis system 108 may update values for these session type features. For example, the session type feature of "movie night" may include the value of two, "TV sessions" may include the value of five, "watchlist" may include the value of zero, and "frustrated" may include the value of 10. An example of classifying a session into a session type will be described in FIG. 4.

At 208, session analysis system 108 may optionally determine values for non-session type features. Non-session type features may be features that are not associated with the session types. For example, non-session type features may include an age, a gender, a time of day, etc. In some examples, non-session type data may not be used.

At 210, session analysis system 108 inputs the values for the session type features and the non-session type features into one or more models. At 212, the prediction model analyzes values for the features to determine a prediction. The one or more models is configured to generate a prediction or predictions based on the input. The prediction may be a score that may rate a probability of an output. Also, the prediction may include multiple scores for multiple outputs. In some embodiments, the outputs may be probabilities that outcomes may occur, such as whether a user account will disengage with the service, upgrade service, etc. An example of predictions may be assigning a probability of 90 percent that the user account will disengage with the service and 2 percent the user account will upgrade the service.

At 214, the one or more models outputs the prediction. The prediction may be used to determine an action for the user account. For example, the user interface may be changed to recommend different content based on an analysis of the values for the session types. Also, video delivery system 106 may communicate with the user account based on the values for the session types. For example, the values for the session types may indicate that the user is having trouble finding content and video delivery system 106 may attempt to provide content that the user may request for playback on the user interface or via email.

FIG. 3 depicts an example of raw session data and formatted session data according to some embodiments. Although raw session data and formatted session data are described, session analysis system 108 may use either types of data, or other formats of data. A table 300 depicts raw session data and a table 302 depicts formatted session data.

Table 300 summarizes messages that are received for different events that may occur during a session. A session may be associated with multiple messages for different events. Table 300 includes a column 304 that lists a user identifier (ID), a column 306 that lists a session identifier (ID), a column 308 that lists a timestamp, and a column 310 that lists an event. Other information may also be included in the messages. The user ID identifies a user account, the session ID identifies the session in which the message is associated, a timestamp represents the time the event occurred, and the event describes the event that occurred. In column 304, messages are received for two user IDs of "123" and "456", which may be two different account accounts. The session IDs identify the sessions, such as user ID 123 had two sessions of "123-1" and "123-2", and user ID 456 had one session of "456-1". The session ID may be determined based on different events. For example, client device 104 may determine a session ID and insert the session ID into the messages. In other examples, session analysis system 108 may determine the session IDs.

Various events occurred during these sessions, such as a log on event, a search event, a stream start event, a stream end event, a crash, and other events could have occurred. The log on event may be when a user account logged on to use the service, and a log off event may be when the user account logged off the service. A search event may be when a user is searching for content, a stream start event may be when the user account started playback of content, and a stream end event may be when the user account stopped playback of content. A crash event may be when an error occurred with the delivery of content, such as the playing back of content had an error. Other events may also be appreciated, and events may be different when activity other than using a video delivery service is being analyzed.

Table 302 depicts formatted session data that is determined based on the raw session data. In some embodiments, a single entry may be for a single session, but a session may be summarized in multiple formatted session entries. For example, the data for a single session may be stored in a single row or multiple rows. For example, a session may be stored in multiple entries when different session types are detected in the session, such as when a session is very long and different interactions occur. For example, if the user forgot to turn TV off or sign out, the session may be split into three sub-sessions, the late night session, the night session where nothing happened, and the early morning one). The data for the three sub-sessions may be aggregated for each respective sub-session.

Table 302 includes a column 312 that includes the session ID. Then, different session characteristics may be provided for each session. For example, at columns 314, 316, 318, 320, 322, the characteristics of session duration, number of searches, number of crashes, number of streams, and stream duration, respectively, are shown. Session duration may summarize the duration of the session, the number of searches may be the number of searches performed during the session, the number of crashes may be the number of crashes that occurred during the session, the number of streams may be the number of instances of content that were played back, and stream duration may be the total duration of content that was played back in the session. Other characteristics may also be used.

In some embodiments, session analysis system 108 may use data from messages in the raw session data to generate values for the session characteristics. For example, session analysis system 108 may aggregate, average, combine, etc. data from the messages. For session ID 123-1, the time-stamps for the session start and session end are used to determine the session duration of 115 minutes. Also, session analysis system 108 analyzes the number of searches performed based on the messages in the raw session data to determine one search was performed. Session analysis system 108 also determines values for the other characteristics. For example, the number of streams is one in session 123-1 and the stream duration was 113 minutes based on the stream start and stream end. Session analysis system 108 similarly determines the values for characteristics for session ID 123-2 and 456-1.

Figure 4:
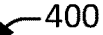
FIG. 4 depicts an example of raw session data, formatted session data, and characteristics for session types according to some embodiments.

The following describes an example of determining values for the session type features as described at 206 in FIG. 2. FIG. 4 depicts an example of raw session data, formatted session data, and characteristics for session types according to some embodiments. A table 400 summarizes the messages received for a single session of 123-1. The events include a log on, a search, a stream start, and a stream stop. Table 402 depicts the formatted session data. For session 123-1, the session duration is 115 minutes, the number of searches is one, the number of crashes is zero, the number of streams is one, and the stream duration is 113 minutes.

Table 404 depicts session types with associated values for characteristics of each session type. For example, session types may be labeled as 1, 2, 3, and 4 in column 406 and a column 408 lists a label for the session type of movie, TV, watchlist, frustrated, respectively. For example, session type 1 may be when the session most likely involved the watching a movie, session type 2 may be when the session most likely involved watching two or more consecutive episodes of the same show, session type 3 may have involved most likely adding some content to a watchlist to playback later, and session type 4 may have been a session in which the user account is frustrated and did not playback any content or add any content to a watchlist. Each session type may include session type characteristics. For example, at columns 410, 412, 414, 416, and 418, the session characteristics include session duration, number of searches, number of crashes, number of streams, and stream duration, respectively. These are the same characteristics found in the formatted session data. However, the session characteristics for each session type may be different than the characteristics found in the formatted session data. For example, some characteristics for session types may combine characteristics from the formatted session data.

The values for the session characteristics for each session type may be used to classify a session into a session type. For example, for a movie session type, the session duration may be around 100 minutes long and the stream duration may around 95, and the number of streams may be around one. Other session types may have other values for characteristics, such as a TV session type may have a session duration of 180 minutes, a stream duration of 175 minutes, and a number of streams around 5. While a watchlist session type may have a short session duration with a number of searches of five with a number of streams being zero and a stream duration of zero. The frustrated content type may have a short stream duration with a large number of searches. Although not shown, the watchlist session type may include characteristics of adding instances of content to a watchlist and the frustrated content type may not include any instances of content that are added to the watchlist.

Session analysis system 108 may analyze the formatted session data and determine a session type that may be most probable for the session. For example, the session type 1 of movie may be most probable for the session ID 123-1 because the session duration is 115 minutes, the stream duration is 113 minutes, and the number of streams is one. These numbers may be most closely related to the movie session type compared to other session types. In contrast, the session duration and the stream duration of session 123-1 may not be close to the values for the watchlist and frustrated session types. Accordingly, session analysis system 108 may classify session 123-1 in the movie session type. The classification may result in the session type value being incremented by one for the movie session type. Although classifying the session in a single session type is described, other methods for determining the values for session type features may be used. For example, the classification may use scores for each session type. The score for the movie session type may be 0.9 and the scores for the watchlist and frustrated session types may be 0.05 and 0.05, respectively, and these values may be added to the session type feature values.

The above process continues for to classify each session. Then, the values for the session type features may be determined after analyzing the sessions found in the formatted session data. It is noted that some sessions may not fall within a session type and/or may fall within multiple session types.

Training

Figure 5:
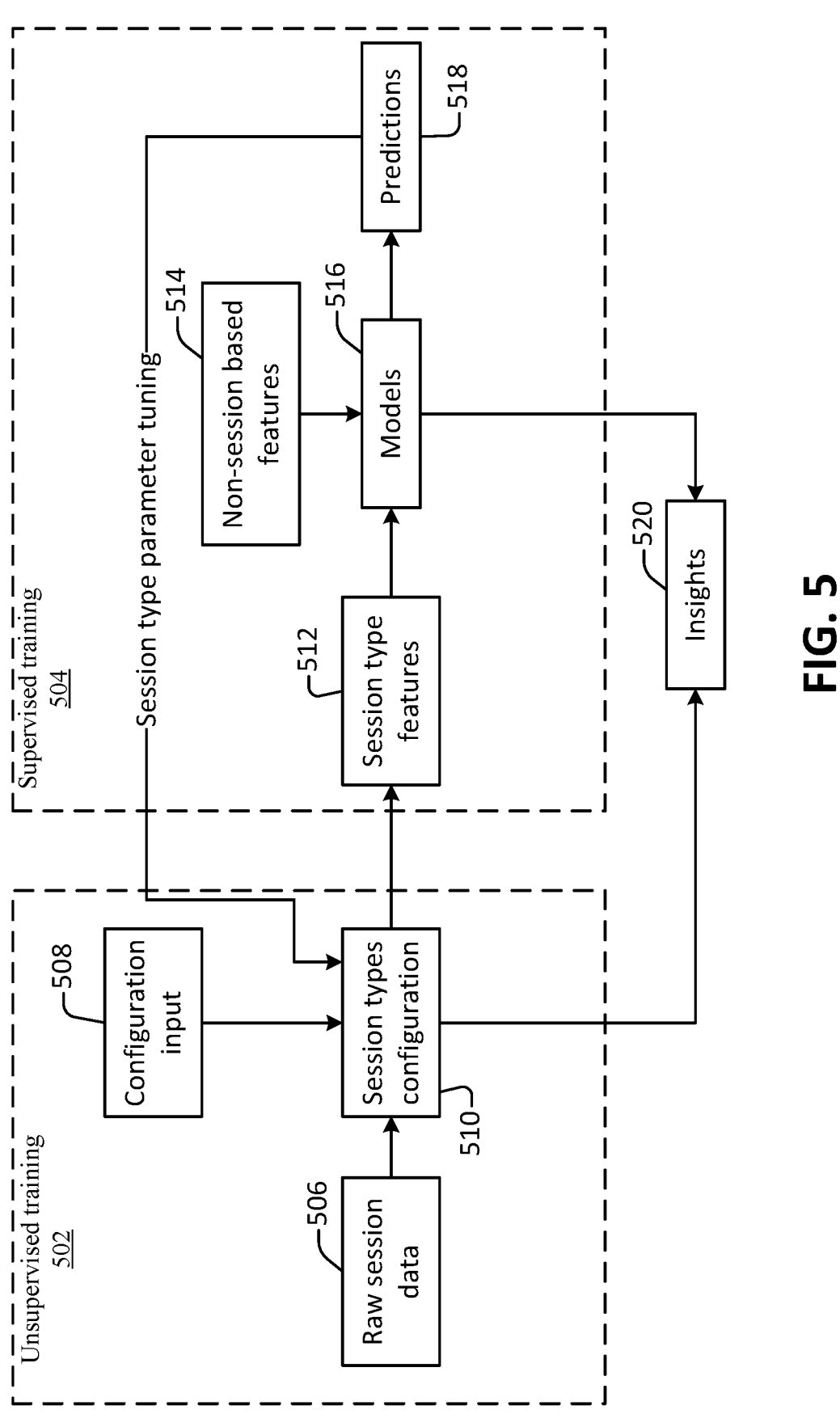
FIG. 5 depicts an example of the training according to some embodiments.

The following will now discuss the configuration of the session types and the training of the model. In some embodiments, each predicted outcome may be associated with a model. For example, a first model predicts a score for a Movie session type, a second model predicts a score for a TV session type, a third model predicts a score for a Watchlist session type, a fourth model predicts a score for a Frustrated session type. The following training may be performed for each model. In other embodiments, a model may be configured to output scores for multiple predicted outcomes. FIG. 5 depicts an example of the training according to some embodiments. Unsupervised training 502 and supervised training 504 may be performed; however, other types of training may also be used.

In unsupervised training 502, the number of session types may be determined. For example, raw session data may be analyzed and clustered into groups to determine the characteristics of session types. In supervised training 504, models may be trained using supervised information to use session type features to generate predictions. The supervised training may use known information or ground truths. For example, session type features for user accounts that disengaged with the service may be used as supervised information to train the models to generate predictions for disengaging with the service.

In unsupervised training 502, at 506, session data, such as raw session data, is received. Although raw session data is described, other types of data may be used, such as formatted session data. At 508 configuration input for the session type configuration may be received. The configuration input may be used to guide the number of session types that are generated from analyzing the raw session data. For example, a clustering algorithm may be used to process the raw session data to cluster the raw session data into a certain number of clusters with similar data. The number of clusters may be defined by the configuration input and can be changed as training progresses. The clusters may group similar sessions into clusters. In some examples, domain knowledge from video delivery system 106 may be used to select the number of session types that can be clustered from the raw session data.

The configuration input may also include key session characteristics that may define a session type, such as the length of the session, the number of movies streamed, the number of instances of content added to the watchlist, time spent searching titles, whether watching an instance of content was stopped and resumed, the day of the week, etc. At 510, the session type configuration process may group similar sessions together in a defined number of clusters. The characteristics of the clusters may be defined based on values from the sessions that are included in each cluster. For example, the values described in table 404 of FIG. 4 may be determined from the sessions included in each cluster. Once the clusters are defined, the clusters may be labeled as a type of session type, such as movie, TV, watchlist, frustrated, etc.

The output of the session type configuration is then provided to supervised training 504. For example, the output may be the session types and the associated characteristics. Supervised training 504 may use supervised information, such as known session type features at 512 and non-session based features at 514 to generate the predictions at 518 that result in a prediction. For example, the session type features may involve the number of respective session types that resulted in an outcome of disengaging with the service. In some examples, a value of 15 for the "frustrated" session type may be used for a user account that disengaged with the service. The values for other session type features may also be input into model 516, which generate a prediction or predictions. The predictions may be a probability of one or more outcomes. For example, the outcome of disengage with service may have a first probability, the outcome of upgrade service may have a second probability, etc.

Session analysis system 108 may compare the prediction to the known outcome. Depending on the difference between the known outcome and the prediction, model parameter tuning may be performed. For example, session analysis system 108 may update the parameters of model 516 based on the difference between the outputted prediction and the known outcome. If the known outcome is "disengage with service", but the outputted prediction assigned a low probability to "disengage with service", then the supervised training may adjust the parameters of model 516 to predict an outcome of "disengage with service" with a higher probability. If the outputted prediction assigned a high probability to "disengage with service", then the supervised training may not adjust the parameters of model 516 to predict an outcome of "disengage with service" with a higher probability or adjust the parameters less than above when the low probability was predicted. Other types of training of models 516 may also be appreciated.

Session types parameter tuning of the session type configuration at 510 may also be performed. For example, session analysis system 108 may compute a performance metric value for different session type configurations. Based on the performance metric, session analysis system 108 may select values of the session type configuration. For example, session analysis system 108 may use the performance metric to select which session type configuration performed optimally. Also, the feedback may be used to adjust the session type configuration parameters. For example, if the generated prediction is not close to the known output, then session analysis system 108 may update the session type configuration, such as session analysis system 108 may change the number of clusters that is generated from the raw session data. Also, other parameters of the session type configuration may be changed, such as session analysis system 108 may change the characteristics that are used that define a session type. The use of the feedback is described in more detail in FIGS. 6 and 8.

Insights 520 may also be generated from the output of session type configuration 510 and predictions of models 516. For example, some insights may be based on the analysis of types of sessions that are occurring. After clusters for session types are determined, session analysis system 108 may determine that a large number of sessions in one or more clusters have less than one minute of streaming activity or no streaming activity. This may alert video delivery system 106 that a large amount of user accounts may not end up watching anything in sessions. Other insights from the output of models 516 may include certain session types that may be resulting in the disengagement with the service or certain session types that may be resulting in the upgrading of service. Video delivery system 106 may attempt to use characteristics of these session types in the experiences for other user accounts.

The following will now describe the unsupervised training method and the supervised training method in more detail.

Unsupervised Training

Figure 6:
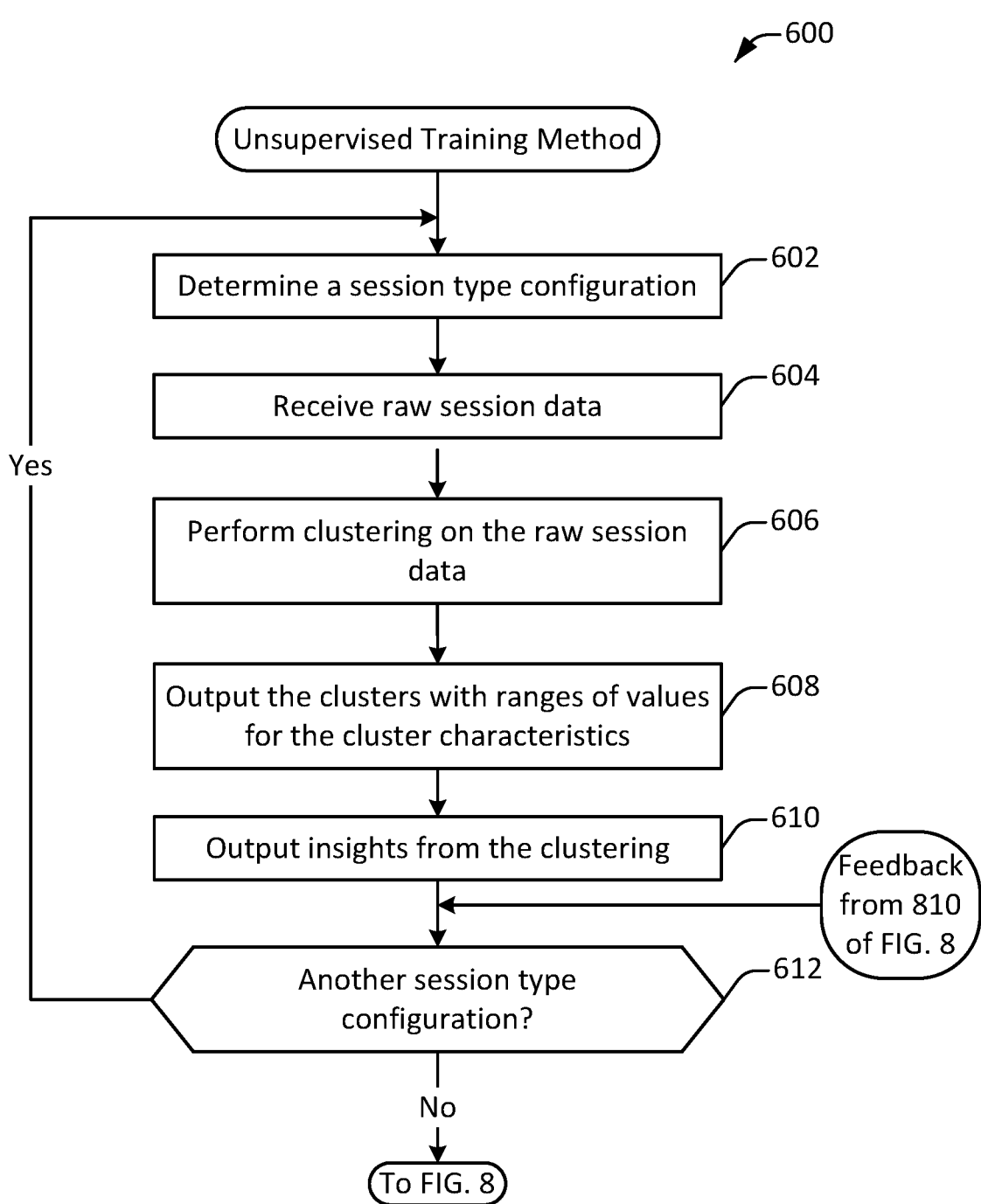
FIG. 6 depicts simplified flowchart of a method for performing unsupervised training according to some embodiments.

FIG. 6 depicts simplified flowchart 600 of a method for performing unsupervised training according to some embodiments. At 602, session analysis system 108 determines a session type configuration. The session type configuration may include parameter values that are used to cluster data into session types. For example, the session type configuration may include characteristics that may include the number of session types and also characteristics that may be associated with session types. As described in FIG. 4, the characteristics may include a session duration, a number of searches, a number of crashes, a number of streams, a stream duration, etc.

At 604, session analysis system 108 receives raw session data. At 606, session analysis system 108 performs clustering on the raw session data. The clustering may use different clustering algorithms to generate the clusters and group similar sessions from the raw session data into the clusters.

Figure 7:
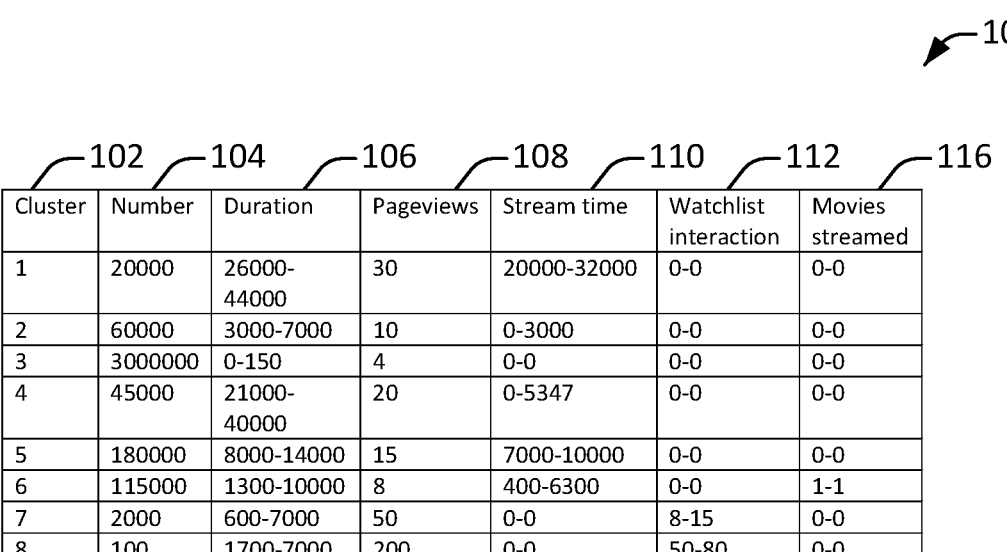
FIG. 7 depicts an example of a table describing clusters that are determined according to some embodiments.

At 608, session analysis system 108 outputs clusters with values for the characteristics for the session types. The data associated in each cluster may be summarized for different characteristics. In some embodiments, ranges of values for characteristics may be determined from the associated sessions in the respective clusters. An example of values is shown at FIG. 7. The ranges of values may be determined differently, such as the minimum and maximum of the values from the cluster, the average of the values in the cluster, the values between 10% and 90% of the values in the cluster, etc.

At 610, session analysis system 108 outputs insights from the clustering. For example, session analysis system 108 may analyze the data for the characteristics for patterns to determine insights, which are output. At 612, session analysis system 108 determines if there is another session type configuration to process. For example, there may be multiple session type configurations that are used to generate clusters, which are used in the supervised training process to train the models. The training process will be described in more detail below in FIG. 8. Also, based on feedback from the supervised training process at 812 of FIG. 8, additional session type configurations or changes to session type configurations may be generated and used to generate clusters. If there is another session type configuration, the process reiterates to 602 to process the new session type configuration. If there is not another session type configuration, the process proceeds to FIG. 8 to perform supervised training.

FIG. 7 depicts an example of a table 700 describing clusters that are determined according to some embodiments. The session type configuration may indicate eight clusters are desired. The values that are determined may be associated with sessions from the raw session data. For example, session analysis system 108 determines ranges or average values from the sessions.

At 702, clusters 1-8 that are formed from the raw session data are shown. Each cluster may be associated with a session type, which may be labeled with different labels, but labels for training purposes may not be needed. Also, columns 704, 706, 708, 710, 712, and 716 describe different characteristics of the number of sessions, the duration of these sessions, the number of pageviews, the stream time, the number of watchlist interactions, and the movies streamed, respectively. The number of sessions is a count of sessions that are within the cluster, the duration is the range of the durations from each of the sessions, the pageviews is the average number of pageviews that occur in each of the sessions, the stream time is the range of stream times from each the sessions, the watchlist interaction is the range of interactions with the watchlist in each of the sessions, and the movies streamed is the number of movies played back for each of the sessions. As mentioned above, the numbers may be ranges, averages, or other values.

For cluster number 1, the number of sessions in the cluster is 20,000 and the range of duration of these sessions was from 26,000 to 44,000 seconds. The average number of pageviews is 30. The stream time of streaming content is in the range of 20,000 to 32,000 seconds. The watchlist interaction is zero and the number of movies streamed is zero. Different clusters may have different characteristics. For example, cluster number 7 includes 2000 sessions with a shorter duration of 600 seconds to 7000 seconds. A larger number of pageviews of 50 and a larger number of watchlist interactions of 8-15. Cluster number 8 includes a smaller number of sessions of 100. These sessions include characteristics of a large number of pageviews of 200 with a larger watchlist interaction of 50-80 interactions.

The above numbers may be used to characterize the respective session types. For example, the characteristics in table 700 may be used to determine a likelihood a session applies to one of the session types, if any. In some examples, a session that streams a movie may be classified in session type 6 and a session that performed a large number of watchlist interactions may be classified in session type 7.

Supervised Training

Figure 8:
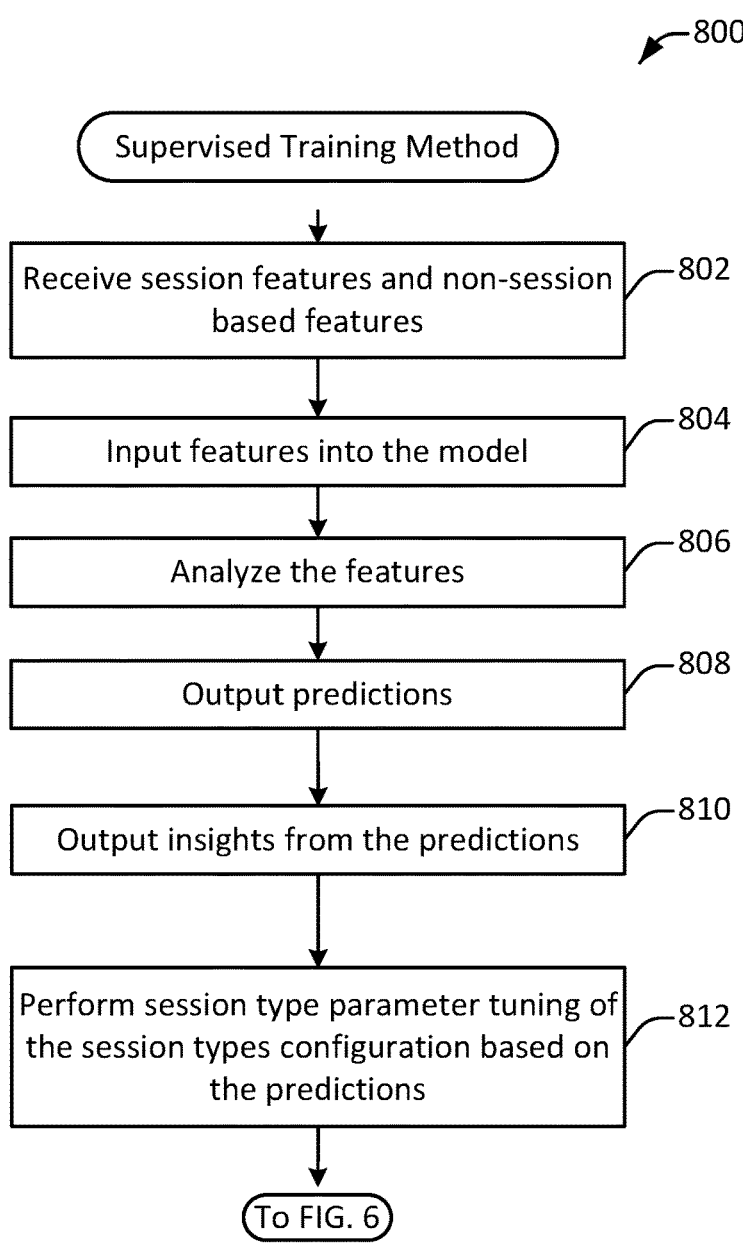
FIG. 8 depicts a simplified flowchart of a method for performing supervised training according to some embodiments.

FIG. 8 depicts a simplified flowchart 800 of a method for performing supervised training according to some embodiments. At 802, session analysis system 108 receives session type features and non-session type based features. At 804, session analysis system 108 inputs the features into models 516. At 806, models 516 analyze the features. At 808, models 516 generate predictions. The predictions may be a probability for one or more outcomes based on the features.

At 810, session analysis system 108 may output insights from the prediction. Also, the parameters of models 516 may be updated as described above.

At 812, session analysis system 108 performs session type parameter tuning of the session type configuration based on the predictions. Different types of training may be used. For example, session analysis system 108 may change the number of clusters in the session type configuration. For example, if the outputted prediction is not close to the known outcome, then the number of session types may be increased or decreased. The increase in the number of session types may allow the models to predict the outcome with more granularity. The decrease in the number of session types may allow the models to predict the outcome with less granularity. If the outputted prediction is close to the known outcome, then the number of session types may be kept the same. The predictions may also be used to determine which parameter values of the session type configuration may be optimal. For example, the raw session data may be split into a training data set and a validation data set. Different possible parameter values for the session type configuration may be determined and used to create clusters for the training data set and the validation data set. For example, different session type parameter values may include different numbers of clusters. The value is used to create clusters for each session type configuration. Then, models 516 may be trained using the clusters created by the training data set for all of the session type configurations. After training models 516, feedback from the supervised process may be used to select values for parameters in the session type configuration.

In some examples, the validation data set is used to determine predictions using the trained models 516. Session analysis system 108 determines a performance metric value based on the predictions for each session type configuration. Based on feedback from the supervised training process, session analysis system 108 may select parameter values for the session type configuration. For example, each session type configuration may be associated with a performance metric. Session analysis system 108 may select the session type configuration with the highest performance metric to use when analyzing data for a user account. Also, session analysis system 108 may use the performance metric to adjust some values of the session type configurations or add new session type configurations. The process may revert back to FIG. 6 to adjust some parameter values of the session type configuration or to select parameter values to use when performing predictions after the training.

CONCLUSION

The use of session type features may improve the prediction process in different ways. For example, resource cost may be reduced, such as the number of features that need to be stored may be reduced because fewer features are used and less data for the features needs to be stored. Also, the model may be simpler because session types may be analyzed instead of a large number of features. This may simplify the logic of the models. The session types may include multiple characteristics that define a session instead of multiple individual features.

The insights that are determined from the session types may be an improvement. For example, these session types may be more meaningful, interpretable, and transparent because these session types may be attributed to the outcome whereas a large number of features would make it hard to directly attribute a feature to impacting the outcome. The higher quality outcome and cause of the outcome may allow the service to react to the outcome in more efficient manner, such as to improve the service such that the outcome may not occur or improve the service such that additional favorable outcomes occur.

System

Figure 9:
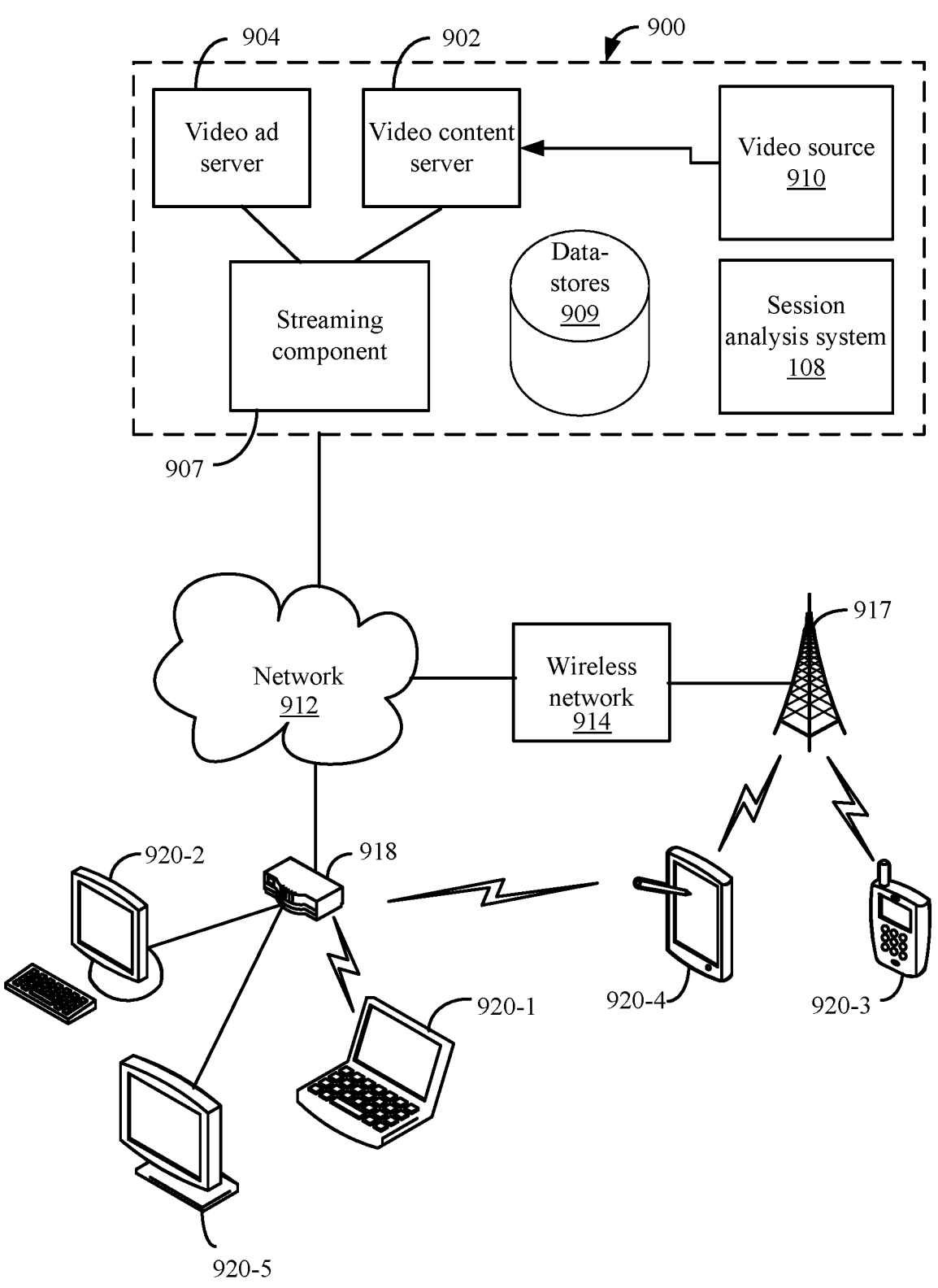
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 also may include session analysis system 108.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless network 914 (e.g., a wireless cellular telecommunications network (WCS)), or some combination of these or similar networks.

One or more client devices 920 may be in communication with the video streaming system 900, via the data communication network 912, wireless network 914, or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for wireless network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HyperText Transfer Protocol (HTTP) and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
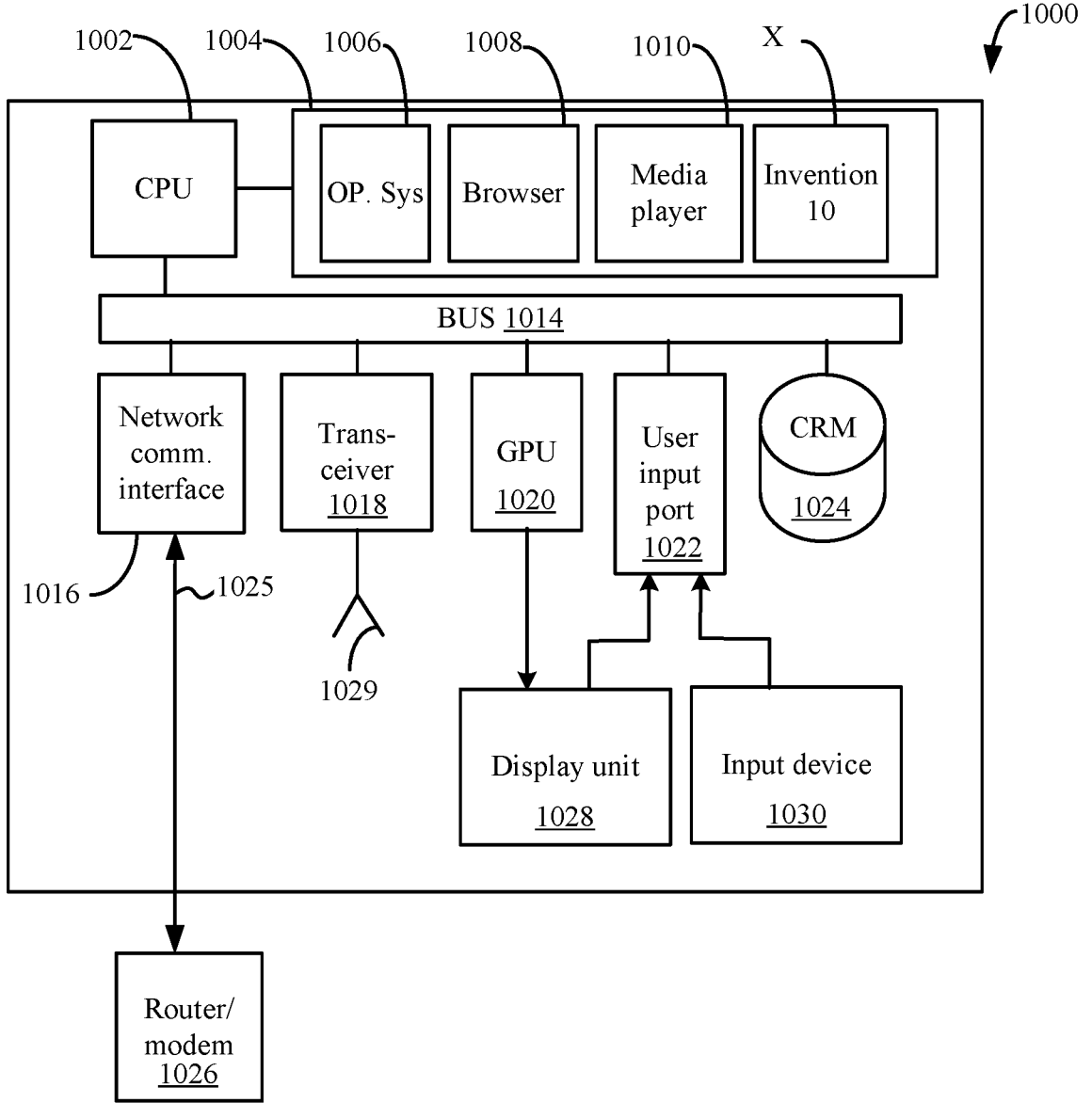
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules for operating system 1006, browser 1008, and media player 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A network communication (comm.) interface 1016 may also be connected to the bus 1014. The network communication interface 1016 may provide or support two-way data communication between the apparatus 1000 and one or more external devices, e.g., the streaming system 900, optionally via a router/modem 1026 and a wired or wireless connection 1025. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a," "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving, by a computing device, data for sessions that is generated based on use of a service;
determining, by the computing device, a plurality of session characteristic values for a plurality of session characteristics based on a start of respective sessions and an end of respective sessions, wherein events that occur in between the start and the end are used to determine respective session characteristic values in the plurality of session characteristic values for the respective sessions, and wherein, for each session, events for the respective session are used to generate the plurality of session characteristic values for the respective session;
classifying, by the computing device, the sessions into a plurality of session types, wherein the plurality of session characteristic values for the sessions is compared to a plurality of reference characteristic values for respective session types in the plurality of session types to perform the classifying, wherein at least two different session types are associated with different reference characteristic values;
generating, by the computing device, feature values based on a count of occurrences for session types in the plurality of session types based on sessions being classified in respective session types, wherein an occurrence of the session is aggregated and increases a count for an updated feature value upon classifying the session in the session type and the updated feature value is the count;
analyzing, by the computing device, the feature values for the plurality of session types using a model to generate a prediction for the service, wherein the count for the updated feature value is input into the model; and
outputting, by the computing device, the prediction.

2. The method of claim 1, wherein a session comprises data from the start of the session and the end of the session.

3. The method of claim 2, wherein:
the start of the session is a log on event, and
the end of the session is a log off event.

4. The method of claim 1, wherein receiving the data for sessions comprises:
receiving a plurality of messages including events for the sessions, wherein the events are used to determine the data for the sessions.

5. The method of claim 1, wherein classifying the sessions comprises:
determining session characteristic values for a session;
comparing the session characteristic values for the session to the plurality of reference characteristic values for a session type; and
determining that the session is classified in the session type based on the comparing.

6. The method of claim 5, wherein classifying the sessions comprises:
selecting a session type based on the plurality of session characteristic values of the session meeting the plurality of reference characteristic values for the session type.

7. The method of claim 1, wherein classifying the sessions comprises:
updating the count for the feature value for the session type upon classifying the session in the session type.

8. The method of claim 1, wherein analyzing the feature values for the plurality of session types using the model to generate the prediction comprises:

analyzing the feature values to predict a probability of an outcome based on the count of occurrences of sessions being classified in session types in the plurality of session types.

9. The method of claim 1, wherein analyzing the feature values for the plurality of session types using the model to generate the prediction comprises:

training the model based on a known session type causing a known outcome.

10. The method of claim 1, further comprising:

determining a configuration for classifying the sessions into the plurality of session types based on analyzing training data from sessions using the model.

11. The method of claim 10, wherein determining the configuration comprises:

clustering the training data from sessions into a plurality of clusters using a plurality of configurations, wherein each configuration creates a different number of session types;

evaluating predictions of the model using the different number of session types for each configuration in the plurality of configurations; and determining the configuration for classifying the session types based on the evaluating.

12. The method of claim 11, wherein determining the configuration comprises:

determining performance values for each of the different number of session types; and selecting a configuration for a number of session types based on the performance values.

13. The method of claim 12, wherein determining the number of session types comprises:

determining a number of session types for a configuration based on the performance values.

14. The method of claim 13, wherein determining the number of session types comprises:

re-clustering the training data from sessions into the number of session types, wherein similar sessions are clustered in a session type.

15. A non-transitory computer-readable storage medium having stored thereon computer executable instructions, which when executed by a computing device, cause the computing device to be operable for:

receiving data for sessions that is generated based on use of a service;

determining a plurality of session characteristic values for a plurality of session characteristics based on a start of respective sessions and an end of respective sessions, wherein events that occur in between the start and the end are used to determine respective session charac- teristic values in the plurality of session characteristic values for the respective sessions, and wherein, for each session, events for the respective session are used to generate the plurality of session characteristic values for the respective session;

classifying the sessions into a plurality of session types, wherein the plurality of session characteristic values for the sessions is compared to a plurality of reference characteristic values for respective session types in the plurality of session types to perform the classifying, wherein at least two different session types are associ- ated with different reference characteristic values;

generating feature values based on a count of occurrences for session types in the plurality of session types based on sessions being classified in respective session types, wherein an occurrence of the session is aggregated and increases a count for an updated feature value upon classifying the session in the session type and the updated feature value is the count;

analyzing the feature values for the plurality of session types using a model to generate a prediction for the service, wherein the count for the updated feature value is input into the model; and outputting the prediction.

16. An apparatus comprising:

one or more computer processors; and a computer-readable storage medium comprising instruc- tions for controlling the one or more computer proces- sors to be operable for:

receiving data for sessions that is generated based on use of a service;

determining a plurality of session characteristic values for a plurality of session characteristics based on a start of respective sessions and an end of respective sessions, wherein events that occur in between the start and the end are used to determine respective session charac- teristic values in the plurality of session characteristic values for the respective sessions, and wherein, for each session, events for the respective session are used to generate the plurality of session characteristic values for the respective session;

classifying the sessions into a plurality of session types, wherein the plurality of session characteristic values for the sessions is compared to a plurality of reference characteristic values for respective session types in the plurality of session types to perform the classifying, wherein at least two different session types are associ- ated with different reference characteristic values;

generating feature values based on a count of occurrences for session types in the plurality of session types based on sessions being classified in respective session types, wherein an occurrence of the session is aggregated and increases a count for an updated feature value upon classifying the session in the session type and the updated feature value is the count;

analyzing the feature values for the plurality of session types using a model to generate a prediction for the service, wherein the count for the updated feature value is input into the model; and outputting the prediction.

17. The apparatus of claim 16, wherein classifying the sessions comprises:

determining session characteristic values for a session;

comparing the session characteristic values for the session to the plurality of reference characteristic values for a session type; and determining that the session is classified in the session type based on the comparing.

18. The apparatus of claim 16, wherein analyzing the feature values for the plurality of session types using the model to generate the prediction comprises:

analyzing the feature values to predict a probability of an outcome based on the count of occurrences of sessions being classified in session types in the plurality of session types.

19. The apparatus of claim 16, further operable for:

determining a configuration for classifying the sessions into the plurality of session types based on analyzing training data from sessions using the model.

20. The apparatus of claim 19, wherein determining the configuration comprises:

clustering the training data from sessions into a plurality of clusters using a plurality of configurations, wherein each configuration creates a different number of session types;

evaluating predictions of the model using the different number of session types for each configuration in the plurality of configurations; and determining the configuration for classifying the session types based on the evaluating.

\* \* \* \* \*